United States Patent [19]

Harwood et al.

[11] 4,272,778

[45] Jun. 9, 1981

[54] COLOR-DIFFERENCE SIGNAL PROCESSING CIRCUITS

[75] Inventors: Leopold A. Harwood, Bridgewater, N.J.; Robert L. Shanley, II, Indianapolis, Ind.

[73] Assignee: RCA Corporation, New York, N.Y.

[21] Appl. No.: 126,783

[22] Filed: Mar. 3, 1980

[51] Int. Cl.³ .......................... H04N 9/50; H04N 9/52
[52] U.S. Cl. ........................................ 358/23; 358/30
[58] Field of Search .................................... 358/23, 30

[56] References Cited

U.S. PATENT DOCUMENTS

| | | | |
|---|---|---|---|
| 2,857,457 | 10/1958 | Richman | 178/5.4 |
| 2,922,838 | 1/1960 | Torre | 178/5.4 |
| 3,340,355 | 9/1967 | Richman | 178/5.4 |

OTHER PUBLICATIONS

RCA Linear Integrated Circuits Brochure File No. 688, entitled CA 3121G TV Chrome Amplifier/Demodulator, published by RCA Solid State Division, Nov. 1977.

*Primary Examiner*—John C. Martin
*Attorney, Agent, or Firm*—Eugene M. Whitacre; Paul J. Rasmussen; William H. Meagher

[57] ABSTRACT

A first resistive current path is DC connected between respective output terminals of push-pull color demodulator. A second resistive current path is DC connected between respective output terminals of a second push-pull color demodulator. An output color-difference signal is formed by a differential amplifier having one input DC connected to an asymmetrically positioned point in first resistive current path, and a second input DC connected to an asymmetrically positioned point in second resistive current path. Output color-difference signal corresponds to a combination of the demodulated signals, with a polarity relationship and magnitude ratio determined by the asymmetry of positioning of the takeoff points in the respective current paths. Output quiescent voltage is independent of the asymmetry of positioning of the takeoff points.

10 Claims, 1 Drawing Figure

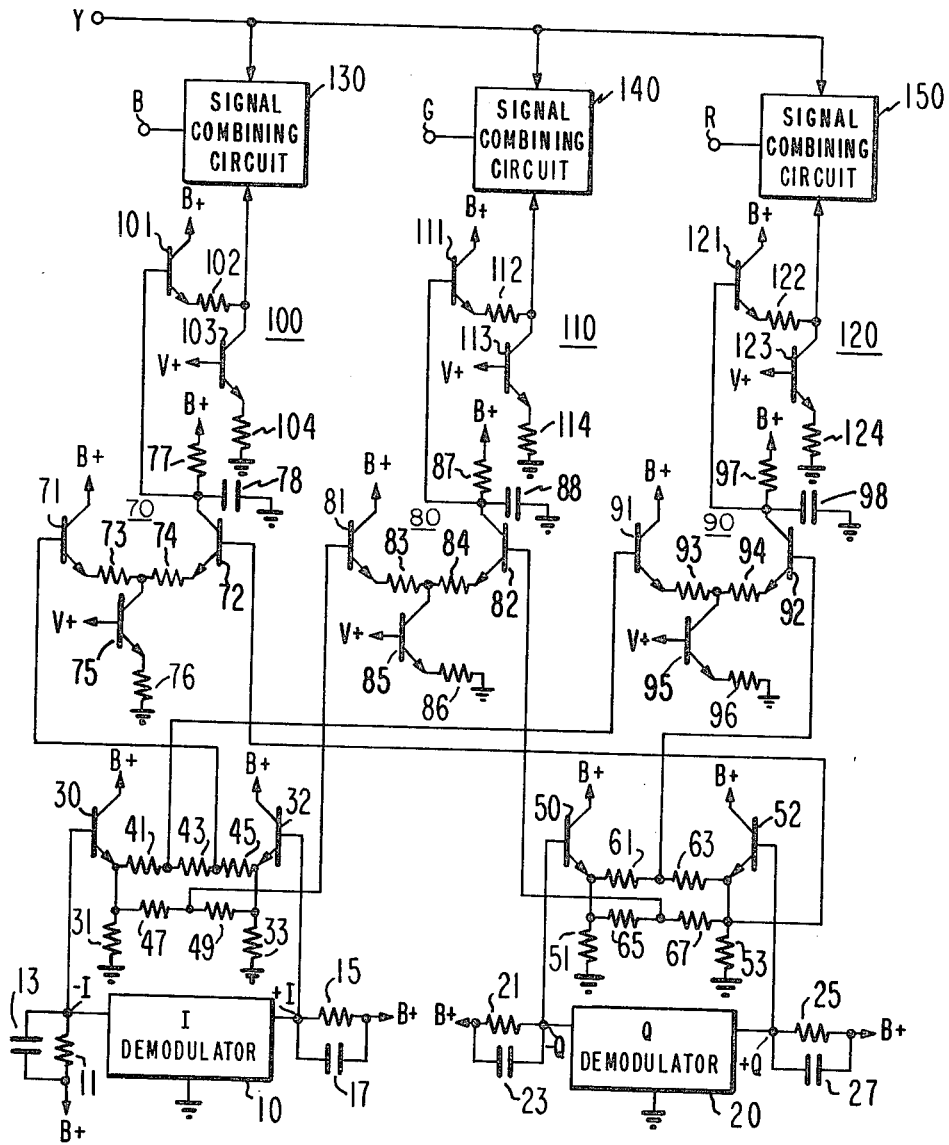

COLOR-DIFFERENCE SIGNAL PROCESSING CIRCUITS

The present invention relates generally to color-difference signal processing circuits, and particularly to novel circuit arrangements for effecting matrixing of color-difference signal outputs of push-pull color demodulators, of particular advantage when these functions are implemented by circuitry realized in integrated circuit form.

In conventional color television receivers, the red, green and blue color signals (R, G, B) supplied to the color image reproducing device of the receiver are formed by combining the received luminance signal (Y) with respective ones of a set of correlated color-difference signals, R-Y, G-Y, and B-Y. While it is possible, in at least some of the standard color television systems, to individually recover each of these color-difference signals by a separate demodulation of the chrominance component of the received signal, the usual practice in receivers for all of the standard color television systems is to employ only two color demodulators. When the color-difference signals directly recovered by demodulation correspond to two of the desired set, it is conventional practice to form the third by use of a matrixing circuit combining the recovered color-difference information with appropriate polarity relationship and magnitude ratio. When none of the color-difference signals directly recovered by demodulation correspond to the color-difference signals (R-Y, G-Y, B-Y) of the ultimately desired set, as, for example, in receivers for an NTSC type of system in which demodulation along the so-called I and Q demodulation axes has been chosen (e.g., to facilitate use of a flesh-tone correction system of the type shown in U.S. Pat. No. 3,663,774—Harwood), it is appropriate to use a trio of matrixing circuits which combine the recovered color-difference signals with respective polarity relationships and magnitude ratios appropriate to the formation of R-Y, G-Y and B-Y color difference signals therefrom.

In the practical design of color television receivers, it is usually desired that the set of R, G, B color signals delivered to the color kinescope driver stages represent variations about respective quiescent voltages that are quite closely matched. Deviations from such a closely matched relationship can hamper achievement of proper set-up of the color kinescope for faithful color image reproduction. Where DC coupling is employed throughout the processing of the color-difference signal information recovered by the color demodulators, the effects of the color-difference signal matrixing process on the quiescent voltages associated with the set of delivered color signals should be carefully dealt with if the desired matching goal is to be attained.

The present invention is directed to a novel color-difference signal matrixing arrangement which is compatible with both use of DC coupling throughout color-difference signal processing (as is particularly desired, for example, where the processing functions are implemented by circuitry realized in integrated circuit form) and attainment of the aforesaid quiescent voltage matching goal.

In accordance with the principles of the present invention, a pair of push-pull color demodulators are employed, each having a pair of output terminals at which respective versions of a particular color-difference signal appear with mutually opposite polarity as variations about closely matched quiescent voltages, and each having associated therewith a resistive current path direct current conductively connected between its pair of output terminals. An output color-difference signal, different from either of the color-difference signals directly recovered by the respective color demodulators, is formed by means responsive to the respective voltages appearing at respective asymmetrically positioned takeoff points in the two current paths, and direct current conductively connected thereto. The output color-difference signal corresponds to a combination of the color-difference signals recovered by the demodulators, with a polarity relationship and magnitude ratio determined by the asymmetry of positioning of the takeoff points in the respective resistive current paths. However, the output color-difference signal appears as variations about an output quiescent voltage of a magnitude which is independent of the asymmetry of positioning of the takeoff points (since, in each resistive current path, all points exhibit substantially the same quiescent voltage).

In an illustrative embodiment of the present invention, the above-described matrixing approach is advantageously employed to effect three difference combinations of I and Q color-difference signals, so as to develop output color-difference signals of R-Y, G-Y, and B-Y form varying about output quiescent voltages which may readily be maintained in closely matched relationship.

In the accompanying drawing, the sole FIGURE illustrates, partially schematically and partially by block representation, a portion of a color television receiver incorporating a color-difference signal matrixing arrangement embodying the principles of the present invention.

In the illustrated system, a pair of push-pull color demodulators (10, 20) are provided. Demodulator 10 serves to recover I color-difference signal information from the modulated color subcarrier constituting the chrominance component of a received color television signal, developing a +I color-difference signal at the output terminal so designated and a −I color-difference signal at the output terminal so designated. Respective demodulator load resistors (11, 15) are connected between the respective output terminals (−I, +I) and the positive terminal (B+) of an energizing potential source. The load resistors 11 and 15 are respectively shunted by respective capacitors (13, 17), serving a filtering function to aid in suppression of subcarrier component frequencies.

Demodulator 20 similarly serves to recover Q color-difference signal information from the modulated color subcarrier, developing a +Q color-difference signal at the output terminal so designated, and a −Q color-difference signal at the output terminal so designated. Respective demodulator load resistors (21, 25) are connected between the respective output terminals (−Q, +Q) and the B+ terminal. The load resistors 21 and 25 are respectively shunted by respective capacitors (23, 27), similarly serving the above-described filtering function.

Illustratively, each of the demodulators 10 and 20 is of the balanced type employed, for example, in the RCA CA3137E integrated circuit, as shown in the Linear Integrated Circuits brochure designated File No. 970, entitled CA3137E TV Chroma Demodulator, and published by the RCA Solid State Division.

The −I output terminal is directly connected to the base of an NPN transistor 30, which is disposed as an emitter-follower, with its collector directly connected to the B+ terminal and its emitter returned to the energizing potential source's negative terminal (illustratively, ground, and so referred to hereinafter) via an emitter resistor 31. The +I output terminal is directly connected to the base of an NPN transistor 32, which is disposed as an emitter-follower, with its collector directly connected to the B+ terminal and its emitter returned to ground via an emitter resistor 33.

Resistors 41, 43 and 45 are serially connected, in the order named, between the emitter of transistor 30 and the emitter of transistor 32. Resistors 47 and 49 are also serially connected, in the order named, between the emitter of transistor 30 and the emitter of transistor 32, forming a current path shunting the current path formed by resistors 41, 43, 45.

The −Q output terminal is directly connected to the base of an NPN transistor 50, disposed as an emitter-follower, with its collector directly connected to the B+ terminal and its emitter returned to ground via an emitter resistor 51. The +Q output terminal is directly connected to the base of an NPN transistor 52, disposed as an emitter-follower, with its collector directly connected to the B+ terminal and its emitter connected to ground via emitter resistor 53.

Resistors 61 and 63 are serially connected, in the order named, between the emitter of transistor 50 and the emitter of transistor 52. Resistors 65 and 67 are also serially connected, in the order named, between the emitter of transistor 50 and the emitter of transistors 52, forming a current path in shunt with the current path formed by resistors 61, 63.

The illustrated system also includes a trio of differential amplifiers (70, 80, 90). Differential amplifier 70 includes a pair of NPN transistors (71, 72) with their emitters interconnected via the series combination of resistors 73 and 74. A substantially constant current source is provided for differential amplifier 70 by an NPN transistor 75, with its collector connected to the junction of resistors 73 and 74, with its emitter returned to ground via a resistor 76, and with its base directly connected to the positive terminal (V+) of a bias source. The collector of transistor 71 is directly connected to the B+ terminal, while the collector of transistor 72 is connected to the B+ terminal via a load resistor 77. A filter capacitor 78, connected between the collector of transistor 72 and ground, effects relative attenuation of subcarrier component frequencies.

Differential amplifier 80 includes a pair of NPN transistors (81, 82) with their emitters interconnected via the series combination of resistors 83 and 84. A substantially constant current source is provided for differential amplifier 80 by an NPN transistor 85, with its collector connected to the junction of resistors 83 and 84, with its emitter returned to ground via a resistor 86, and with its base directly connected to the V+ bias terminal. The collector of transistor 81 is directly connected to the B+ terminal, while the collector of transistor 82 is connected to the B+ terminal via a load resistor 87. A filter capacitor 88, connected between the collector of transistor 82 and ground, effects relative attenuation of subcarrier component frequencies.

Differential amplifier 90 includes a pair of NPN transistors (91, 92) with their emitters interconnected via the series combination of resistors 93 and 94. A substantially constant current source is provided for differential amplifier 90 by an NPN transistor 95, with its collector connected to the junction of resistors 93 and 94, with its emitter returned to ground via a resistor 96, and with its base directly connected to the V+ bias terminal. The collector of transistor 91 is directly connected to the B+ terminal, while the collector of transistor 92 is connected to the B+ terminal via a load resistor 97. A filter capacitor 98, connected between the collector of transistor 92 and ground, effects relative attenuation of subcarrier component frequencies.

An I input signal component for differential amplifier 70 is derived from the junction of resistors 43 and 45, which junction is directly connected to a noninverting input terminal of differential amplifier 70 at the base of transistor 71. A Q input signal component for differential amplifier 70 is derived from the emitter of transistor 52, which is directly connected to an inverting input terminal of differential amplifier 70 at the base of transistor 71. With the sum of the resistance values of resistors 41 and 43 appropriately larger than the resistance value of resistor 45, the asymmetry of the position of the takeoff point at the junction of resistors 43 and 45 is such as to provide an attenuated +I input component for differential amplifier 70 for differential combination with the unattenuated +Q input component in a ratio resulting in the development of a color-difference signal of −(B-Y) form at the collector of transistor 72.

An I input signal component for differential amplifier 80 is derived from the junction of resistors 47 and 49, which junction is directly connected to a noninverting input terminal of differential amplifier 80 at the base of transistor 81. A Q input component for differential amplifier 80 is derived from the junction of resistors 65 and 67, which junction is directly connected to an inverting input terminal of differential amplifier 80 at the base of transistor 82. With the resistance value of resistor 47 appropriately larger than the resistance value of resistor 49, and with the resistance value of resistor 67 appropriately larger than the resistance value of resistor 65, amplifier 80 effects differential combination of a +I input signal component and a −Q input signal component in a ratio resulting in the development of a color-difference signal of −(G-Y) form at the collector of transistor 72.

An I input signal component for differential amplifier 90 is derived from the junction of resistors 41 and 43, which junction is directly connected to the noninverting input terminal of differential amplifier 90 at the base of transistor 91. A Q input signal component for differential amplifier 90 is derived from the junction of resistors 61 and 63, which junction is directly connected to the inverting input terminal of differential amplifier 90 at the base of transistor 92. With the sum of the resistance values of resistors 43 and 45 appropriately larger than the resistance value of resistor 41, and with the resistance value of resistor 61 appropriately larger than the resistance value of resistor 63, amplifier 90 effects differential combination of a −I input signal component and a +Q input signal component in a ratio resulting in the development of a color-difference signal of −(R-Y) form at the collector of transistor 82.

The illustrated system also includes a trio of level shifting networks 100, 110, and 120. Level shifting network 100 includes an NPN transistor 101 with its base directly connected to the collector of transistor 72 so as to receive the −(B-Y) signal developed across load resistor 77. The collector of transistor 101 is directly connected to the B+ terminal, while the emitter of transistor 101 is returned to ground via the series combination of a resistor 102, the collector-to-emitter path of an NPN transistor 103, and a resistor 104. The base of transistor 103 is directly connected to the V+ bias terminal. A level shifted version of the −(B-Y) signal, appearing at the collector of transistor 103, is supplied to a signal combining circuit 130, for differential combination with a luminance signal input supplied thereto from terminal Y to develop a blue color signal output at output terminal B.

Level shifting network 110 includes an NPN transistor 111 with its base directly connected to the collector of transistor 82 so as to receive the −(G-Y) signal developed across lead resistor 87. The collector of transistor 111 is directly connected to the B+ terminal, while the emitter of transistor 111 is returned to ground via the series combination of a resistor 112, the collector-to-emitter path of an NPN transistor 113, and a resistor 114. The base of transistor 113 is directly connected to the V+ bias terminal. A level shifted version of the −(G-Y) signal, appearing at the collector of transistor 113, is supplied to a signal combining circuit 140, for differential combination with a luminance signal input applied thereto from terminal Y to develop a green color signal output at output terminal G.

Level shifting network 120 includes an NPN transistor 121 with its base directly connected to the collector of transistor 92 so as to receive the −(R-Y) signal developed across load resistor 97. The collector of transistor 121 is directly connected to the B+ terminal, while the emitter of transistor 121 is returned to ground via the series combination of a resistor 122, the collector-to-emitter path of an NPN transistor 123, and a resistor 124. The base of transistor 123 is directly connected to the V+ bias terminal. A level shifted version of the −(R-Y) signal, appearing at the collector of transistor 123, is supplied to a signal combining circuit 150, for differential combination with a luminance signal input applied thereto from terminal Y to develop a red color signal output at output terminal R.

The precise nature of the matrixing equations to be employed in forming R-Y, B-Y and G-Y signals from I and Q signal inputs depends in part on the characteristics of the phosphors employed in the color kinescope of the receiver. A set of matrixing equations which has been found to provide satisfactory results with current color kinescopes is as follows:

$$R\text{-}Y = +0.866I + 0.500Q$$

$$B\text{-}Y = -0.618I + 1.027Q$$

$$G\text{-}Y = -0.233I - 0.233Q$$

Normalizing this set of equations so as to express the largest input component (the Q component used in forming B-Y) as unity, one obtains the following:

$$R\text{-}Y = +0.843I + 0.487Q$$

$$B\text{-}Y = -0.602I + 1.000Q$$

$$G\text{-}Y = -0.227I - 0.227Q$$

The table of illustrative values for the components of the illustrated system which is set forth below includes values for the I and Q scaling resistors appropriate for matrixing pursuant to the above matrixing equations:

| Resistors 11, 15, 21, 25 | 5K |
|---|---|
| Resistors 31, 33, 51, 53 | 6.8K |
| Resistors 73, 74, 83, 84, 93, 94 | 1.6K |
| Resistors 76, 86, 96 | 4K |
| Resistors 77, 87, 97 | 10K |
| Resistors 103, 113, 123 | 5.25K |
| Resistors 107, 117, 127 | 5K |
| Resistor 41 | 393 ohms |
| Resistor 43 | 3.6K |
| Resistor 45 | 997 ohms |
| Resistors 47, 67 | 3066 ohms |
| Resistors 49, 65 | 1933 ohms |
| Resistor 61 | 3715 ohms |
| Resistor 63 | 1285 ohms |
| Capacitors 13, 17, 23, 27 | 22.8 pf |
| Capacitors 78, 88, 98 | 11.4 pf |

Illustratively, all of the system elements shown in the accompanying drawing are realized in integrated circuit form on a common substrate. The matrixing approach of the present invention is of particular advantage when such realization in integrated circuit form is effected. Variations in the ratios of the I and Q input component scaling resistors, unit to unit, as may be encountered in the results of mass production of the integrated circuit, have substantially no adverse effect on the desired close matching of output quiescent voltages at terminals R, B and G. The subsequent processing stages, such as differential amplifiers 70, 80, 90 and level shifting networks 100, 110, 120, can be designed for identical configurations, with the consequence of assurance that unit to unit variations in these areas are unlikely to disturb attainment of the goal of closely matching output quiescent voltages.

What is claimed is:

1. In a color television receiver, apparatus comprising, in combination:

a first push-pull color demodulator having first and second output terminals, the voltage at said first output terminal varying about a quiescent voltage of a first magnitude in representation of a first color-difference signal with a first polarity, and the voltage at said second output terminal varying about a quiescent voltage of a magnitude closely matching said first magnitude in representation of said first color-difference signal with a second polarity opposite to said first polarity;

a second push-pull color demodulator having third and fourth output terminals, the voltage at said third output terminal varying about a quiescent voltage of a magnitude closely matching said first magnitude in representation of a second color-difference signal with said first polarity, and the voltage at said fourth output terminal varying about a quiescent voltage of a magnitude closely matching said first magnitude in representation of said second color-difference signal with said second polarity opposite to said first polarity;

a first resistive current path;

means for direct current conductively connecting said first resistive current path between said first and second output terminals;

a second resistive current path;

means for direct current conductively connecting said second resistive current path between said third and fourth output terminals; and means, direct current conductively coupled to an asymmetrically positioned intermediate point of said first resistive current path and to an asymmetrically positioned intermediate point of said second resistive current path and responsive to the respective voltages appearing at said intermediate points, for forming a third color-difference signal representative of a combination of said first and second color difference signals with a given polarity relationship and a given magnitude ratio.

2. Apparatus in accordance with claim 1 wherein said third color-difference signal forming means comprises a current source; a load resistor; and first and second transistors, each having base, emitter and collector electrodes, with the base electrodes thereof respectively connected to different ones of said intermediate points, with the emitter electrodes thereof connected to said current source, and with one of said collector electrodes connected to said load resistor across which said third color-difference signal is formed.

3. Apparatus in accordance with claim 1, also including:
   a third resistive current path;
   means for direct current conductively connecting said third resistive current path between said first and second output terminals;
   a fourth resistive current path;
   means for direct current conductively connecting said fourth resistive current path between said third and fourth output terminals; and
   means, direct current conductively coupled to an asymmetrically positioned intermediate point of said third resistive path and to an asymmetrically positioned intermediate point of said fourth resistive current path and responsive to the respective voltages appearing at said intermediate points, for forming a fourth color-difference signal representative of a combination of said first and second color-difference signals with a second polarity relationship different from said given polarity relationship and with a second magnitude ratio different from said given magnitude ratio.

4. Apparatus in accordance with claim 3, also including:
   means, direct current conductively coupled to a second asymmetrically positioned intermediate point of said first resistive current path, different from said first-named asymmetrically positioned intermediate point of said first resistive current path, and to a terminus of said second resistive current path and responsive to the respective voltages appearing at said second intermediate point and at said terminus, for forming a fifth color-difference signal representative of a combination of said first and second color-difference with a third polarity relationship different from said given polarity relationship and said second polarity relationship, and with a third magnitude ratio different from said given magnitude ratio and said second magnitude ratio.

5. Apparatus in accordance with claim 4 wherein each of said color-difference signal forming means comprises a differential amplifier with respective inputs direct current conductively connected to respective points of said current paths and providing an output across a load resistor, with all of said differential amplifiers having substantially matching circuit configurations, and with all of said load resistors having substantially matching resistance values.

6. Apparatus in accordance with claim 5 also including:
   a trio of signal combining circuits, each having a luminance signal input terminal, a color-difference signal input terminal and a color signal output terminal;
   a trio of level shifting networks, each having an input terminal and an output terminal and imparting to signals passing therebetween a level shift, with each network output terminal direct current conductively connected to a respectively different one of the color-difference signal input terminals of said signal combining circuits, with each network input terminal direct current conductively connected to a respectively different one of said load resistors, and with all of said level shifts having substantially matching magnitudes.

7. Apparatus in accordance with claim 6 wherein said demodulators, said resistive current paths, said connecting means, said color-difference signal forming means, said level shifting networks, and said signal combining means are all realized in integrated circuit form on a common substrate.

8. In a color television receiver, apparatus comprising, in combination:
   a first push-pull color demodulator having first and second output terminals, the voltage at said first output terminal varying about a quiescent voltage in representation of a first color-difference signal with a first polarity, and the voltage at said second output terminal varying about a quiescent voltage, of a magnitude closely matching the magnitude of said quiescent voltage at said first output terminal, in representation of said first color-difference signal with a second polarity opposite to said first polarity;
   a second push-pull color demodulator having third and fourth output terminals, the voltage at said third output terminal varying about a quiescent voltage in representation of a second color-difference signal with said first polarity, and the voltage at said fourth output terminal varying about a quiescent voltage, of a magnitude closely matching the magnitude of said quiescent voltage at said third output terminal, in representation of said second color-difference signal with said second polarity opposite to said first polarity;
   a first resistive current path;
   means for direct current conductively connecting said first resistive current path between said first and second output terminals;
   a second resistive current path;
   means for direct current conductively connecting said second resistive current path between said third and fourth output terminals; and
   means direct current conductively coupled to an asymmetrically positioned intermediate point of said first resistive current path and to an asymmetrically positioned point in said second resistive current path and responsive to the respective voltages appearing at said current path points, for forming a third color-difference signal representative of a combination of said first and second color-difference signals with a polarity relationship and a magnitude ratio dependent upon the asymmetry of positioning of said current path points; said third color-difference signal appearing as variations about an output quiescent voltage which has a magnitude substantially independent of the asymmetry of positioning of said current path points.

9. Apparatus in accordance with claim 8 wherein said third color-difference signal forming means comprises a differential amplifier including: a current source; a load resistor; and first and second transistors, each having base, emitter and collector electrodes, with the base electrodes thereof respectively connected to different ones of said current path points, with the emitter electrodes thereof connected to said current source, and with one of said collector electrodes connected to said load resistor across which said third color-difference signal is formed;

wherein said first-named connecting means comprises: a third transistor, disposed as an emitter-follower with its base-emitter path connected between said first output terminal and one terminus of said first resistive current path; and a fourth transistor, disposed as an emitter-follower with its base-emitter path connected between said second output terminal and the other terminus of said first resistive current path; and wherein said second-named connecting means comprises: a fifth transistor, disposed as an emitter-follower, with its base-emitter path connected between said third output terminal and one terminus of said second resistive current path; and a sixth transistor, disposed as an emitter-follower with its base-emitter path connected between said fourth output terminal and the other terminus of said second resistive current path.

10. Apparatus in accordance with claim 9 wherein said first resistive current path consists of: a first resistor connected between said intermediate points and said one terminus of said first resistive current path; and a second resistor, exhibiting resistance of a different magnitude than the resistance exhibited by said first resistor, connected between said intermediate point and said other terminus of said first resistive current path.

* * * * *

UNITED STATES PATENT AND TRADEMARK OFFICE
CERTIFICATE OF CORRECTION

PATENT NO. : 4,272,778
DATED : June 9, 1981
INVENTOR(S) : Leopold A. Harwood, et al.

It is certified that error appears in the above—identified patent and that said Letters Patent is hereby corrected as shown below:

Column 1, line 36, "3,663,774" should be -- 3,663,744 --.

Signed and Sealed this

Twenty-fifth Day of August 1981

[SEAL]

Attest:

GERALD J. MOSSINGHOFF

Attesting Officer

Commissioner of Patents and Trademarks